Patented Oct. 3, 1950

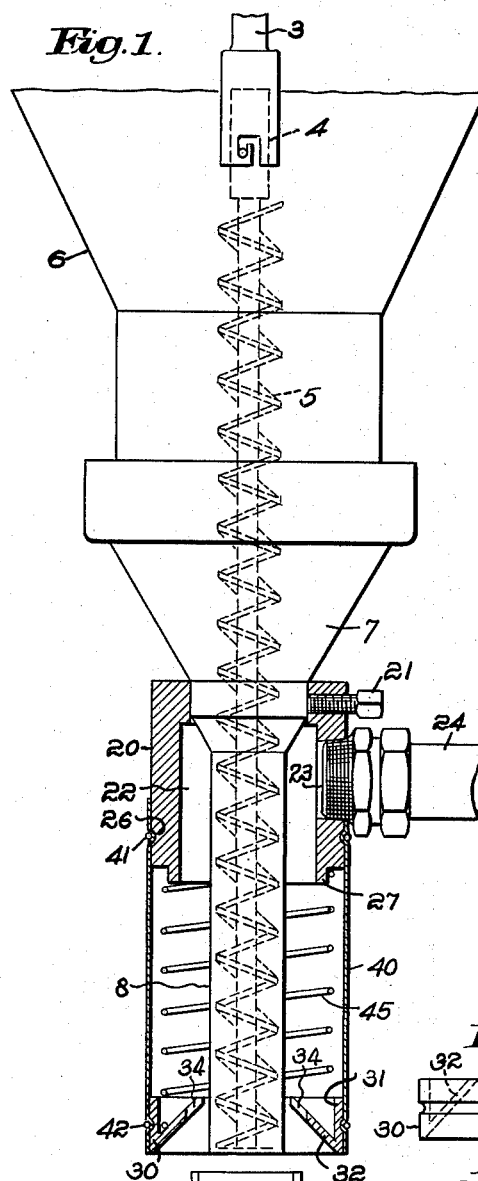
Oct. 3, 1950 — O. E. COTE — 2,524,560
METHOD AND MACHINE FOR FILLING CONTAINERS WITH POWDERED MATERIAL AND FOR REMOVING DUST AND AIRBORNE PARTICLES AT REGION AMBIENT THE CONTAINER
Filed Sept. 22, 1945

2,524,560

UNITED STATES PATENT OFFICE 2,524,560

METHOD AND MACHINE FOR FILLING CONTAINERS WITH POWDERED MATERIAL AND FOR REMOVING DUST AND AIRBORNE PARTICLES AT REGION AMBIENT THE CONTAINER

Omer E. Cote, Providence, R. I., assignor to United States Automatic Box Machinery Co., Inc., a corporation of Massachusetts Application September 22, 1945, Serial No. 618,012

4 Claims. (Cl. 226—25)

My present invention relates to machines and methods for filling containers, particularly with loose dry material in powdered, granular or other small particle form. It aims to provide improved means for inserting the material whereby dense packing is obtained and also to provide simplified means for confining, collecting and removing dust and air-borne particles at the region ambient to the container.

In the drawings illustrating by way of example one embodiment of the invention:

Fig. 1 is a side elevation, partly in vertical section, of a filling machine, showing the filling station and associated parts at the start of a cycle, with an empty container in ready position;

Fig. 2 similarly shows the filling and dust collector parts at an intermediate stage of the cycle, release of material into the container having started; and Figs. 3 and 4 are respectively a side elevation and an outer end view of a movable mouth plate of the packing and dust collector unit of Figs. 1 and 2.

The invention is adapted for use with various machines of the class described and is particularly applicable to those of the rotary feed screw or auger type, examples of which are more fully disclosed in such patents as Bond 1,499,338, July 1, 1924 and Cote 2,324,767, July 20, 1943, and others. The filling machine herein illustrated, sufficiently for an understanding of the present invention, is of such screw-fed type.

Referring to the drawings in more detail, I have indicated at 1 the upper portion of the machine base or lower frame on which the container-presenting mechanism and the main driving and control parts are mounted. The frame 1 also carries one or more vertical standards or upper frame members 2 supporting operating mechanism and connections for the feed drive shaft, a lower portion of which is indicated at 3 including detachable connection as at 4 to the upper end of the rotary feed screw or auger 5.

The filling material is supplied from a bin or other suitable bulk source into a hopper 6 tapering downwardly to an auger funnel 7 having a depending fill tube, extruder or discharge spout 8. The auger extends from its drive shaft 3 to or substantially to the discharge end of the fill tube. Interchangeable tubes and augers may be supplied, of appropriate diameter for reception in the particular size of container to be filled.

The containers, a typical example of which is indicated at C, are successively presented in the filling position, on a vertically movable platform 10 having an elevating rod 11. Positioning and removal of the containers may be manual or automatic, as by the travelling conveyor and offsetting means 12 functioning at suitably timed intervals for the purpose. The platform 10 is raised and lowered or permitted to descend in appropriately timed relation to such container shifting means, and also in timed cooperation with the intermittently driven feed auger 5.

Vertical movement of the platform 10 and rod 11 and rotary feeding action of the auger 5 are effected and controlled through suitable drive and cam control mechanism, diagrammatically and generally indicated at 13 in Fig. 1. Such mechanism preferably is adjustable for variably controlling the relative timing and operating periods of the container positioning, vertically moving and material feeding elements of the machine, including the variable cam means such as that of said Cote Patent 2,324,767. Herein a manual setting member or hand knob for such control is indicated at 14, in conveniently accessible position for the operator. Thus the action may be adjusted for the given filling job, as appropriate to the size of container, volume or weight and character of material to be supplied, and other operating circumstances.

The invention provides in operative combination with the auger-fed spout 8 and the opposed vertically movable platform 10 certain means, herein illustrated as an attachment assembly or unit, adapted to promote dense packing of the material and to collect and remove dust at the filling region. Such means as shown comprises a hollow head or supporting and connective member 20 centrally apertured for mounting in enclosing relation to an upper portion of the spout 8, where it is removably held as by a set screw 21. The head is of a size to provide an annular chamber 22 about the spout, the latter extending centrally through and below the head. A wall of the chamber 22 is apertured as at 23 for threaded or other attachment of a piping connection or conduit 24 subject to the action of a vacuum pump, suction fan or other medium creative of air flow.

The densifying packer and dust collector unit further comprises a lower end member or mouthplate 30 also concentrically disposed about the fill spout 8, in lengthwise spaced relation to the fixed head 20 and movable toward and from the latter in the course of filling operations. As shown the mouth plate 30 is an annular member having a peripheral flange 31 and an integral transverse or bottom wall 32 centrally apertured for guided sliding movement along the spout 8. The bottom face of the plate, as provided by the transverse wall 32, is centrally and symmetrically concaved, for seating engagement over the filling end of a container C. For cylindrical containers, cans or the like, and those having cylindrical fill openings, the plate-seating cavity may be of general conical form substantially as illustrated, noting particularly Figs. 3 and 4, the down-flaring wall 32 being thus adapted for seating and centering at the mouth of containers of different diameters.

For purposes later explained the mouth-plate 30 has further aperturing means or formations such as 34, 34, etc. preferably symmetrically disposed about the central aperture 33 in selected number and arrangement. They are so located and of an area and radial extent such that some portion thereof lies laterally beyond the wall of the particular container such as C. As to this feature see particularly Fig. 2.

It is thus insured that a draft opening or suction passage is at all times available upwardly past the mouth-plate 30, between the seating wall 32 thereof and the mouth of the container. Desirably also the aperturing 34 extends in beyond the container lip, toward or to the central aperture 33, thus providing for draft passage or suction upwardly between the container wall and the spout 8 when the latter is in the container, as in Fig. 2. Such outer and inner aperturing of the mouth-plate 30, with respect to the seated position of the container lip, may be otherwise shaped, proportioned and arranged than as shown by way of example, including separate series of circumferentially distributed openings, the radially outer and inner portions not necessarily communicating with each other or with the central guide aperture 33. The transverse or bottom wall 32 of the mouth-plate includes lands or solid portions such as 35 alternating with the aperturing 34, for centrally and slidably guiding the mouth-plate with respect to the spout 8 and of an area and arrangement suitable for seating the plate on a container C.

The head 20 and mouth-plate 30 are operatively connected, with capacity for movement of the plate toward and from the head, by means of a variable-length tubular wall member 40, herein of fabric or other flexible sheet material adapted for folding in the manner of a bellows, so as to be contractible and extensible lengthwise. This sleeve-like element 40, which may be formed as a seamless tubing or otherwise, has its opposite ends shaped and proportioned respectively to enclose the lower portion of the head 20 and the peripheral flange 31 of the mouth-plate 30, to which it is secured in sealed relation in any suitable manner. For readily movable assembly the outer wall of the head may be formed with a peripheral groove 26 to receive a securing ring, spring clamp or the like 41 applied around the sleeve member. Similarly the mouth-plate 30 is shown as having an external annular groove 36 for locating a holding ring 42 enclosing the lower end of the sleeve.

As noted, the connective tubing or sleeve 40 is of a flexible sheet material adapting it for collapsing endwise in the manner of an accordion or bellows, the free intermediate portion of the sleeve then forming itself into a number of circumferential fluted folds or plaits 40a, Fig. 2. The fabric, rubber, rubber-like or similar material of the sleeve also is such as to resist permeation by air. Thus the sleeve 40 together with the bottom member or mouth-plate 30 and the head 20 provides an air-confining passage or chamber of variable length around the spout 8, at times coextensive with the latter or substantially so and at other times longitudinally reduced, as in Fig. 2 so that the spout is in effect projected axially beyond it. While the sleeve need not be completely impervious to air, it is of such limited porosity as to form with the end members 20 and 30 a confining passage for upward flow of air along a container, exteriorly and interiorly of the latter, to the exhaust connection 24. At the same time the material of the sleeve prevents escape through it of air-borne particles of the filling material, such dust-like particles being thereby collected and carried off to any suitable receiver. The term "air" is intended to include gaseous mixtures, such as may be employed in certain filling operations.

The movable end member or mouth-plate 30 may be of metal or other composition, preferably of a weight tending normally to hold the flexible sleeve 40 extended substantially as in Fig. 1. To assist in that respect, and for guiding and centralizing the folding portion of the sleeve, spring means may be provided within it, urging the mouth-plate 30 away from the head 20, downward in this instance, and insuring return extension of the sleeve. For this purpose I have shown in Figs. 1 and 2 an expansion spring 45 of the coil type, centrally surrounding the filling spout 8. The lower end of the spring bears against the mouth-plate 30, and conveniently may seat in the annular space between the flange 31 and bottom wall 32. At its upper end the spring 45 has bearing support at the lower end of the head 20 where it is held central as by a depending boss 27 on the head. Such sleeve-guiding and extending spring member 45 is of a diameter to hold the sleeve folds away from the spout in the collapsed position, insuring an uninterrupted longitudinal passage for air and dust yet permitting free folding of the sleeve.

The particular filling machine may be of the measured weight, measured volume or timed filling-type and the platform operating means may be constructed and arranged for depression of the platform 10 and container under the increasing weight of the fill or to effect positive timed lowering of the platform. In Fig. 1 the parts are shown in their relative position preparatory to filling, a container C having been presented on the platform 10, by the conveyor means 12 or otherwise, with the platform still in its normal or lowered position with respect to the fill spout 8. The platform is then elevated by means such as referred to, carrying the container C up into seating engagement with the mouth-plate 30, concentrically of the latter and of the spout. Continued upward movement of the platform thrusts the mouth-plate 30 upward with attendant folding of the sleeve 40 and corresponding relative positioning of the spout in the container, in laterally spaced relation to the fill aperture thereof. The platform operating mechanism and that for the rotary feed screw or auger 5 are so timed and controlled that the terminus of the spout 8 is at or closely adjacent the bottom wall of the container when rotation of the auger and consequent discharge or extrusion of the material is initiated. The material is thus released first at or near the bottom of the container and the fill is built up in the container against the resistance of the platform to downward movement, thereby promoting density and tight packing of the fill. As represented in Fig. 2 a quantity of the filling has already been deposited at the bottom of the container and the latter has started to move down with the platform 10.

Concurrently, by reason of the pack-promoting and dust-collecting means of the invention, a continuous air flow is maintained upwardly both from within the container and externally around it. This simultaneously aids escape of air from the container and carries off floating particles or dust from the region above the container. Since the enclosing variable chamber provided by the sleeve 40 and its relatively movable end members 30 and 40 is in continuous communication with atmosphere, herein through the mouth-plate, the suction or air flow at the conduit 24 need not be interrupted between filling operations, thus avoiding any need for special valves and timing means. At the end of a filling operation the platform has returned to a level as in Fig. 1, with the filled container fully disclosed and ready for removal and closure.

It will be understood that my invention, either as to method or means, is not limited to the exemplary steps or embodiment herein illustrated or described, and I set forth its scope in my following claims.

I claim:

1. In apparatus for filling containers with loose dry material, in combination with a container-entering screw-fed delivery spout, a chambered head on and surrounding the spout above the delivery end, the head being open at the bottom and having an air and dust eduction port in a wall of the chamber, a mouth-plate with a central guide opening with marginal means for slidably mounting it on the spout below the head, a tubular sleeve of flexible sheet material foldably contractible and extensible lengthwise and having one end secured around the open bottom of the head and the other end having the mouth-plate attached as a bottom wall therefor, the mouth-plate having a bottom cavity to seat over and to project laterally of the container fill-opening and having an air-flow port formation laterally outside the spout-receiving guide opening thereof and of radial extent and arrangement providing passage for air and dust to the sleeve from within the container and simultaneously from atmosphere externally adjacent the container.

2. A packer and dust collector assembly for a filling machine having a container-entering fill spout, said assembly comprising an open-bottom chambered head to fit about the spout above the delivery end thereof and having an exhaust outlet, a flexible telescoping air-confining sleeve, a cap-like blower end element for the sleeve having a bottom cavity for seating over a container fill opening and being centrally apertured for guided sliding movement along the spout, said sleeve having the opposite ends sealingly secured respectively to the head and to the lower end element so as to form an air-confining passage of variable length around the spout between the delivery end thereof and the chamber of the head, and said lower end element having air-flow passage means radially beyond the central spout-receiving aperture and adapted for communication with the interior of a container to be filled and for simultaneous communication with atmosphere external to the container thereby to provide for air and dust collective flow externally along the spout and within the sleeve to the head chamber both from within and from without the container.

3. A packer and dust collector assembly for a filling machine of a container-entering spout type, comprising a spout-embracing chambered head having a bottom inlet and an exhaust outlet, a lengthwise contractible and extensible sleeve having the upper end secured about the head inlet, a cap-like rigid mouth element attached at the lower end of the sleeve, said element centrally open for slidably guided reception on such filling machine spout and adapted to seat over a container mouth, other through passage areas on said element communicating between the sleeve and the container mouth in the seated position of said element and also then communicating between the sleeve and external atmosphere around the container, and coil spring means within the sleeve urging it to extended relation and at all times insuring open passage for air and dust through the sleeve and both from within and without a container during filling thereof.

4. The method of filling with loose dry material top-opening impermeable tubular containers of self-supporting rigidity, which comprises presenting above the container a tubular fill spout of substantially less diameter than the container, relatively telescoping the spout within the container to a position near the container bottom while maintaining an open-end cylindrical space directly between the spout and the container wall, forcibly discharging the material initially closely against the container bottom and directly below the open bottom end of such cylindrical space, continuing such discharge to the desired filled level while relatively displacing the spout and the container longitudinally, and throughout the discharge creating and maintaining a pneumatic flow from the region around the spout discharge level in the container unobstructedly directly up through the cylindrical space in the container and also from atmosphere externally adjacent the container top thereby to collect and carry off dust and to promote denser packing of the material in the container.

OMER E. COTE.

REFERENCES CITED

The following references are of record in the file of this patent:

UNITED STATES PATENTS

| Number | Name | Date |
|---|---|---|
| 251,392 | Ward | Dec. 27, 1881 |
| 592,750 | Day | Oct. 26, 1897 |
| 1,154,269 | Penna | Sept. 21, 1915 |
| 1,433,663 | Small | Oct. 31, 1922 |
| 1,499,338 | Bond | July 1, 1924 |
| 1,525,469 | Sparks | Feb. 10, 1925 |
| 1,981,485 | Westin | Nov. 20, 1934 |
| 2,142,990 | Belcher | Jan. 10, 1939 |
| 2,324,767 | Bond | July 20, 1943 |

Certificate of Correction

Patent No. 2,524,560 October 3, 1950

OMER E. COTE

It is hereby certified that error appears in the printed specification of the above numbered patent requiring correction as follows:

Column 5, line 58, for the word "blower" read *lower*;

and that said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*